United States Patent Office 3,480,643
Patented Nov. 25, 1969

3,480,643
ALKYLSULFONYLBENZIMIDAZOLES
Albert William Lutz, Montgomery Township, Somerset County, and Richard Joseph Magee, Princeton, N.J., assignors to American Cyanamid Company, Stamford, Conn., a corporation of Connecticut
No Drawing. Filed May 9, 1967, Ser. No. 637,066
Int. Cl. C07d 49/38
U.S. Cl. 260—309.2          4 Claims

ABSTRACT OF THE DISCLOSURE

Substituted alkylsulfonylbenzimidazole compounds of the formula:

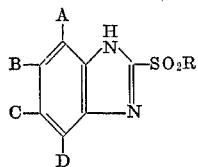

wherein R is lower alkyl and A, B, C, and D are hydrogen or halogen, provided that when any three A, B, C, and D are hydrogen, the one remaining member is halogen. The compounds are prepared by oxidation with m-chloroperbenzoic acid or monoperphthalic acid of their corresponding 2-alkylthiobenzimidazole intermediates and are postemergence herbicides.

---

This invention pertains to new substituted benzimidazole compounds, to a process for preparing the compounds, and to herbicidal methods employing the new compounds.

The new compounds are substituted alkylsulfonylbenzimidazoles of the formula

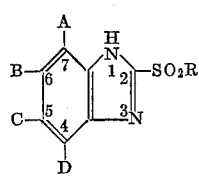

(IV)

wherein R is alkyl and A, B, C, and D are hydrogen or halogen, provided that when any three members among A, B, C, and D are hydrogen, the one remaining member is halogen. The preferred alkyl groups are lower alkyl ($C_1$-$C_7$), particularly those containing 1 through 4 carbon atoms. The preferred halogens are chlorine, bromine and iodine.

The compounds represented by Formula IV above are meant to include structures in which A, B, C, and D are each the same halogen or each are different halogens or combinations of the same and different halogens. For example, A, B, C, and D may each be chlorine; A and B may be chlorine and C and D may be bromine; or A may be iodine, B and C may be chlorine, and D may be bromine. Other combinations of halogens, including combinations with hydrogen atoms, will be apparent. The compounds of the invention also include the obvious equivalents of structures of Formula IV. Thus, the compounds include tautomers of compounds of Formula IV as well as salts of the Formula IV compounds and tautomers. Particularly preferred are the water-soluble salts, the alkali metal (e.g., sodium, potassium) and ammonium salts being representative.

The following are illustrative of the compounds of the invention. The numbering of the benzimidazole ring substitution positions is that of Formula IV above.

2-methylsulfonyl-5-chlorobenzimidazole
2-methylsulfonyl-5-bromobenzimidazole
2-methylsulfonyl-5-iodobenzimidazole
2-methylsulfonyl-5,6-dichlorobenzimidazole
2-isopropylsulfonyl-5,6-dibromobenzimidazole
2-methylsulfonyl-5,6-diiodobenzimidazole
2-ethylsulfonyl-5-chloro-6-bromobenzimidazole
2-methylsulfonyl-5-chloro-6-iodobenzimidazole
2-methylsulfonyl-5-bromo-6-iodobenzimidazole
2-methylsulfonyl-5,6,7-trichlorobenzimidazole
2-n-propylsulfonyl-5-chloro-6-bromo-7-iodobenzimidazole
2-n-butylsulfonyl-5,6-dibromo-7-iodobenzimidazole
2-methylsulfonyl-4,5,6,7-tetrachlorobenzimidazole
2-methylsulfonyl-4-iodo-5,6-dichloro-7-bromobenzimidazole The preferred herbicidal compositions are those in which B and C are chlorine and/or bromine and A and D are hydrogen, and those in which B is chlorine and/or bromine, and A, C, and D are hydrogen, for example:

2-methylsulfonyl-5,6-dichlorobenzimidazole
2-isobutylsulfonyl-5,6-dibromobenzimidazole
2-methylsulfonyl-5-chloro-6-bromobenzimidazole
2-methylsulfonyl-5-chlorobenzimidazole
2-methylsulfonyl-5-bromobenzimidazole Compounds of Formula IV may be prepared by reacting the appropriately substituted phenylenediamine (I) with carbon disulfide to produce 2-mercapto-substituted benzimidazole (II) as shown in (a) below:

(a) 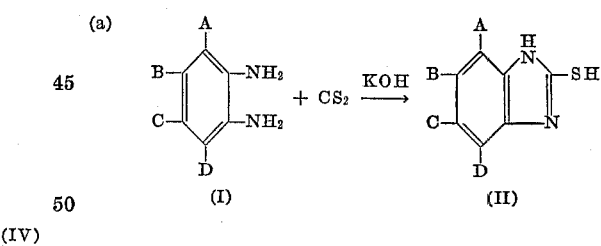

wherein A, B, C, and D are as described above.

The 2-mercapto-substituted benzimidazole (II) is then reacted with an alkyl halide to produce 2-alkylthio substituded benzimidazole (III) as shown in (b) below:

(b) 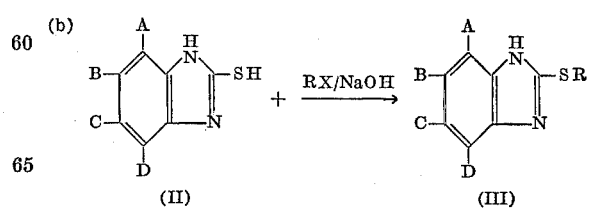

wherein X is halogen and R is as described above.

Reactions (a) and (b) above are known and are described herein for the sake of completeness.

In the third step of the reaction the appropriately substituted 2-alkylthiobenzimidazole (III) is oxidized to compounds of Formula IV.

Although most common oxidizing agents such as hydrogen peroxide, peracetic acid, m-chloroperbenzoic acid, monoperphthalic acid, and aqueous or alcoholic chlorine solutions will suffice to produce the desired substituted 2-alkylsulfonylbenzimidazole, the form in which the 2-alkylsulfonylbenzimidazole is produced has been found to vary markedly depending upon which oxidizing agent is selected. For example, the product ordinarily produced by the majority of oxidizing agents is an oily liquid mass which, in addition to the desired product, contains several other chemical species as indicated by infrared analytical techniques. The purification and isolation of the desired product from this oily mass is found to be extremely difficult, if not impossible. However, when m-chloroperbenzoic acid or monoperphthalic acid are employed as the oxidizing agent, the desired product is surprisingly formed as a distinctly solid precipitate which, upon analysis, is found to contain the desired product plus small quantities of spent oxidizing agent. The precipitated solid material is then readily purified using conventional methods.

The preferred oxidation is illustrated in (c) below:

(C)
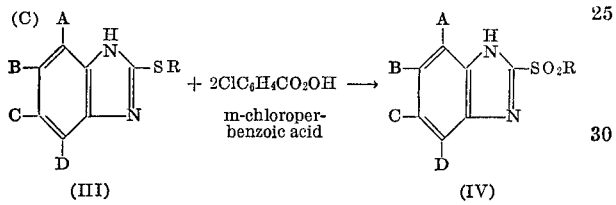

wherein A, B, C, D and R are as described above. The oxidation reaction is conducted in an inert medium, such as an alcoholic solution, preferably containing a lower alkanol such as methyl, ethyl or isopropyl alcohol, for a time and at conditions of temperature and pressure effective for substantially complete reaction. The conditions of reaction, other than oxidizing agent, are therefore generally not critical. Reaction will occur over a broad range of temperature, for example, from about 0° C. to about 100° C., preferably from about 20° C. to 70° C., depending on choice of solvent and pressure, which may be atmospheric, subatmospheric or superatmospheric. It has been observed that reaction occurs readily at about 50° C. and atmospheric pressure. Stoichiometric amounts of 2-alkylthio-substituted benzimidazole (III) and oxidizing agent are effective although preferably an excess of oxidizing agent is employed. Order of addition is not critical and reaction is substantially complete after mixture of the reactants.

The compounds of the invention are highly active postemergence herbicides. They may be applied in the conventional manner, such as liquid sprays, to the foilage of the plant sought to be controlled. They may also be applied as solids in dust or granular formulations, with conventional application equipment. The proportions of herbicide compound in the liquid or solid compositions may be varied as desired, depending on solubility or compatibility with the carrier and on the plant species under treatment. If desired, other additives, such as pesticides and wetting agents, may be employed with the herbicides. Such additives as well as carriers, proportions of ingredients, and mode of application are within the skill of the art.

So far as is known, compounds of Formula IV differ from known compounds in the presence of the alkylsulfonyl group at the position indicated by the numeral 2 in Formula IV. The alkylsulfonyl group is particularly significant when the herbicidal activity is considered. It has been observed, for example, that the herbicidal activity of 2 - methylsulfonyl-5,6-dichlorobenzimidazole is substantially superior to that of 2-methylthio-5,6-dichlorobenzimidazole, particularly with respect to postemergence herbicidal activity against many broad and narrow leaf plant species.

The examples set forth below are intended to further illustrate but not to limit the invention. All parts and percentages are by weight unless otherwise indicated.

EXAMPLE 1

Preparation of 2-methylthio-5,6-dichlorobenzimidazole

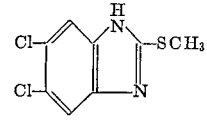

A solution of 2-mercapto-5,6-dichlorobenzimidazole (21.9 g., 0.01 mole) in 125 ml. N sodium hydroxide was allowed to react with a solution of methyl iodide (15.6 g.) in 75 ml. of 95% ethanol. The solid which precipitated was removed by filtration and dried in a vacuum oven to give 20.4 g. (88%) of cream colored needles. After recrystallization from 95% ethanol, the melting point was 200–225° C.

Analysis.—$C_8H_6Cl_2N_2S$ requires: C, 41.21; H, 2.60; Cl, 30.42; N, 12.02; S, 13.75. Found: C, 41.10; H, 2.66; Cl. 30.46; N, 11.91; S, 13.56.

EXAMPLE 2

Preparation of 2-methylsulfonyl-5,6-dichloro-benzimidazole

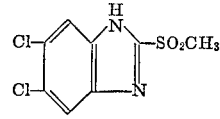

To a solution of 2-methylthio-5,6-dichlorobenzimidazole (7.2 g., 0.03 mole) in 125 ml. of 95% ethanol at 50° C. was added in a dropwise manner a solution of m-chloroperbenzoic acid (0.06 mole) in 100 ml. of ethanol. When the reaction was completed (negative test for peracid with starch-iodide paper), the solvent was removed in vacuo, and the residual solids extracted three time with hot ether. The ether insoluble fraction (6.2 g., 75%) was recrystallized from 95% ethanol to give a white solid with melting point of 190–215° C.

Analysis.—$C_8H_6Cl_2N_2O_2S$ requires: C, 36.24; H. 2.28; N, 10.57; S, 12.09; Cl, 26.74. Found: C, 36.26; H, 2.37; N, 10.65; S, 12.10; Cl. 26.79.

EXAMPLE 3

Preparation of 2-methylthio-5-chlorobenzimidazole

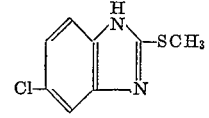

A solution of 2-mercapto-5-chlorobenzimidazole (25.0 g., 0.14 mole) in 135 ml. N sodium hydroxide was allowed to react with a solution of methyl iodide (21.1 g.) in 75 ml. of 95% ethanol. The solid which precipitated was removed by filtration and dried in a vacuum oven to give 21.6 g. (80%) of off-white needles. Thin layer chromatography of the product in ether, ethyl acetate, or chloroform indicated it was homogeneous.

EXAMPLE 4

Preparation of 2-methylsulfonyl-5-chlorobenzimidazole

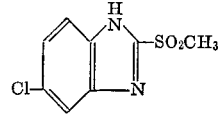

5-chloro - 2-methylthiobenzimidazole (5.0 g., 0.025 mole) was added in portions to a solution of monoperphthalic acid (14.0 g., 0.077 mole) in 200 ml. of anhydrous ethanol. During the addition period of one-half hour, the temperature rose to 46°. After standing overnight, a small quantity of sodium sulfite was added to destroy any excess peracid. After removal of the solvent, the gummy residue was slurried in 100 ml. of chloroform at −50° C. and the undissolved phthalic acid removed by filtration. The filtrate was partially concentrated and recooled to −50° to remove additional acid. This process was repeated three times until the theoretical amount of phthalic acid was collected. The remaining chloroform filtrate (approximately 50 ml.) was diluted with hexane (approximately 7 ml.) until incipient cloudiness was reached. Upon recooling, an oil separated which was removed by decantation of the mother liquor. Additional small quantities of hexane were added until no more oil separated. (Infrared spectra of these fractions indicated they contained the desired sulfone product contaminated with traces of phthalic acid.) At this point addition of hexane precipitated a white solid, 1.3 g., with melting point 136–137°. Thin layer chromatography showed the compound to be pure.

*Analysis.*—$C_8H_7ClN_2O_2S$ requires: C, 41.65; H, 3.06; Cl, 15.37; N, 12.15; S, 13.90. Found: C, 41.41; H, 2.87; Cl, 15.29; N, 11.98; S, 14.05.

EXAMPLE 5

Preparation of 2-methylsulfonyl-4,5,6-trichlorobenzimidazole

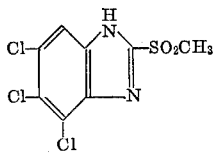

The procedure of Example 2 is repeated in all essential details except that the 2 - methylthio - 5,6-dichlorobenzimidazole is replaced by 2-methylthio-4,5,6-trichlorobenzimidazole which is then reacted with a stoichiometric quantity of m-chloroperbenzoic acid.

EXAMPLE 6

Preparation of 2-methylsulfonyl-4-iodo-5-chloro-6-bromobenzimidazole

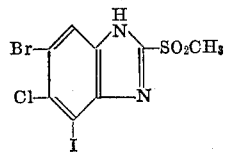

The procedure of Example 2 is repeated in all essential details except the 2-methylthio-5,6-dichlorobenzimidazole is replaced by 2-methylthio-4-iodo - 5 - chloro-6-bromobenzimidazole which is then reacted with a stoichiometric quantity of m-chloroperbenzoic acid.

EXAMPLE 7

Preparation of 2-methylsulfonyl-4-bromo-5,6-dichloro-7-iodobenzimidazole

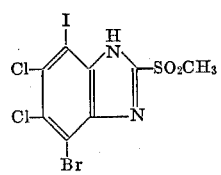

The procedure of Example 2 is repeated in all essential details except that the 2-methylthio-5,6-dichlorobenzimidazole is replaced by 2-methylthio-4-bromo-5,6-dichloro-7-iodobenzimidazole which is then reacted with a stoichiometric quantity of m-chloroperbenzoic acid.

EXAMPLE 8

Preparation of 2-methylsulfonyl-5-chloro-4,6,7-tribromobenzimidazole

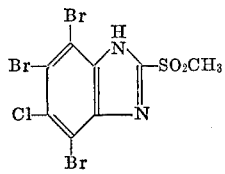

1.2 grams (0.005 mole) of 5-chloro-2-methylsulfonylbenzimidazole were dissolved with stirring in 25 ml. of 10% sodium hydroxide. Bromine was added dropwise until a red color persisted. At this point the pH of the reaction mixture was adjusted to 2.0 with concentrated hydrochloric acid. The solid obtained was filtered and recrystallized from a mixture of acetone and water to yield 1.0 gram (41.3%) of a white solid with melting point 305–307° C. The nuclear magnetic resonance spectrum supported the assigned structure.

*Analysis.*—$C_8H_4Br_3ClN_2O_2S$ requires: C, 20.55; H, 0.86; Br, 51.30; Cl, 7.59; N, 5.99; S, 6.86. Found: C, 20.54; H, 0.82; Br, 51.44; Cl, 7.40; N, 5.88; S, 6.97.

EXAMPLE 9

Postemergence herbicidal test

The postemergence herbicidal activity of the compounds of the instant invention is demonstrated by treating a variety of monocotyledonous and dicotyledonous plants with the compounds dispersed in aqueous-acetone mixtures. In the test seedling plants are grown in jiffy flats for about two weeks. The test compounds are dispersed in 50/50 acetone/water mixtures containing small amounts of a wetting agent in sufficient quantity to produce concentrations of about 0.5, 1, 2, 3, 8, 9, or 10 pounds per acre of test compound when applied to the plants, through a spray nozzle operating at 30 p.s.i. for a predetermined time. After spraying, the plants are placed on greenhouse benches and are cared for in the usual manner, commensurate with conventional greenhouse practices. Two weeks after treatment, the seedling plants are examined and rated as shown in the table according to the herbitoxicity index defined below.

Herbitoxicity Index

9=100% reduction in stand
9—=1 or 2 stunted plants standing
8=85—<100% reduction in stand
7=70—<85% reduction in stand
6=60—<70% reduction in stand
5=50—<60% reduction in stand
m=moderate injury
t=trace to slight injury
—=no test
4=40—<50% reduction in stand
3=30—<40% reduction in stand
2=20—<30% reduction in stand
1=10—<20% reduction in stand
0=no apparent effect
s=severe injury
r=regrowth
a=abnormal effect
g=growth retardant Abbreviations for plant species employed in the herbicidal activity tests of Example 9 are as follows:

BW=bindweed
CT=Canada thistle
JG=Johnson grass
NS=nutsedge
QG=quackgrass
Ko=Kochia
La=lamb's-quarters
Mu=mustard
Pi=pigweed
Ba=barnyard grass
Cr=crabgrass
GF=green foxtail
WO=wild oats

TABLE I

| Test compound | Rate (lbs./acre) | BW | CT | JG | NS | QG | Ko | La | Mu | Pi | Ba | Cr | GF | WO |
|---|---|---|---|---|---|---|---|---|---|---|---|---|---|---|
| 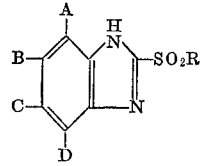 | 0.5 | — | — | — | — | — | 9 | 8 | 3 | 8 | — | — | — | m |
| | 1 | 0 | sr | — | — | — | 9 | 9 | 9 | 5 | t | t | t | 3 |
| | 2 | 9 | 9 | t | 0 | 0 | 9 | 9 | 9 | 9 | t | t | t | 9 |
| | 3 | 0 | 9 | — | — | — | 9 | 9 | 9 | 9 | t | t | t | 2 |
| | 8 | — | — | — | — | — | 9 | 9 | 9 | 9 | — | — | — | 9– |
| | 9 | t | 9 | — | — | — | 9 | 9 | 9 | 9 | t | m | t | 5 |
| | 10 | 9 | 9 | 9– | 0 | t | 9 | 9 | 9 | 9 | t | t | t | 9 |
| Cl—[benzimidazole]—$SO_2CH_3$ | 2 | sr | 9r | 0 | 0 | 0 | t | 5 | 9 | ma | 0 | 0 | 0 | 0 |
| | 10 | 9r | 9r | 0 | 0 | 0 | 9 | 9 | 9 | mg | 0 | 0 | 0 | t |

We claim:

1. A compound of the formula:

$$\begin{array}{c} A \\ B \\ C \\ D \end{array} \text{—benzimidazole—} SO_2R$$

wherein R is alkyl and A, B, C and D are hydrogen or halogen, provided that when any three of A, B, C, and D are hydrogen, the one remaining member is halogen.

2. The compound of claim 1 wherein B and C are chlorine, A and D are hydrogen, and R is methyl.

3. The compound of claim 1 wherein C is chlorine, A, B and D are hydrogen, and R is methyl.

4. The compound of claim 1 wherein A, B and D are bromine, C is chlorine, and R is methyl.

References Cited

UNITED STATES PATENTS 3,341,549   9/1967   Henry _____ 260—309

OTHER REFERENCES

Bednyagina et al., Chem. Abst., vol. 54, cols. 509–10 (1960).

Merck, Chem. Abst., vol. 63, cols. 608–9 (1965).

Taisho, Pharmaceutical Chem. Abst., vol. 58, cols. 13964–5 (1963).

Wagner et al., Synthetic Organic Chemistry, p. 801, N.Y., Wiley, 1953.

HENRY R. JILES, Primary Examiner

NATALIE TROUSOF, Assistant Examiner

U.S. Cl. X.R.

71—92